United States Patent Office 3,000,861
Patented Sept. 19, 1961

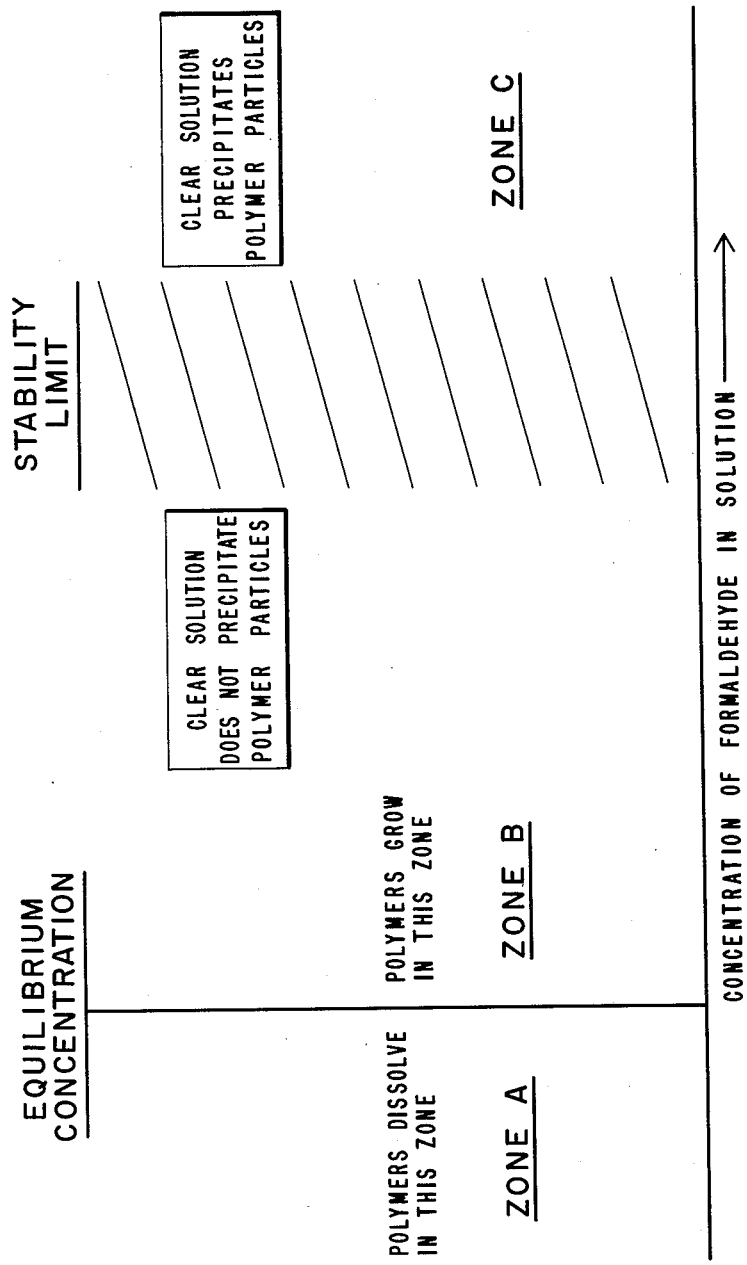

3,000,861
POLYMERIZATION OF AQUEOUS FORMALDEHYDE TO PRODUCE HIGH MOLECULAR WEIGHT POLYOXYMETHYLENE
Northrop Brown, Dennis Light Funck, and Carl Earle Schweitzer, Wilmington, Del., assignors to E. I. du Pont de Nemours and Company, Wilmington, Del., a corporation of Delaware
Filed Dec. 3, 1957, Ser. No. 700,339
10 Claims. (Cl. 260—67)

This invention relates to the preparation of high molecular weight polyoxymethylene from aqueous solutions of formaldehyde.

In U.S. Patent 2,768,994 issued to R. N. MacDonald on October 30, 1956, there is described and claimed a high molecular weight polyoxymethylene which is characterized as having a "degree of toughness" of at least 1, or as having a reaction rate constant for thermal degradation at 222° C. of less than 1% by weight per minute. These characterizations, described in greater detail in MacDonald's patent, differentiate the claimed polyoxymethylene from any prior art polyoxymethylene such as that described in H. Staudinger in "Die Hochmolekularen Organischen Verbindungen," Julius Springer, Berlin (1932), by J. F. Walker in "Formaldehyde" 2d edition, Reinhold Publishing Corp., New York (1953), or by U.S. Patent 2,296,249 issued to P. R. Austin and C. E. Frank on September 22, 1942. The procedures, described in these prior art references, for preparing polyoxymethylenes involve a high degree of purification of the formaldehyde monomer, followed by polymerization of the monomer, with or without a catalyst, in the presence of an inert liquid organic medium, such as hydrocarbon or an ether.

The polymerization of formaldehyde from an aqueous solution has inevitably, in the prior art, resulted in the formation of low molecular weight polymers, such as paraformaldehyde and alpha-polyoxymethylene. These polymers are usually prepared, in the case of paraformaldehyde, by distilling and concentrating the aqueous formaldehyde starting material followed by cooling the concentrate until polymeric particles settle out, and in the case of alpha-polyoxymethylene, by adding a strong acid or a strong base to a concentrated solution of formaldehyde.

Recent contributions to this field of endeavor are those reported by S. Bezzi and A. Iliceto in Chimica e L'Industria 33, 429–36 (1951), and by A. Iliceto in Gazzetta Chimica Italiana, 83, 18–27 (1953). These workers studied the growth of formaldehyde polymers in aqueous formaldehyde solutions and concluded that the equilibrium relationships between the solid polymer and the liquid formaldehyde solutions were such that only polymers of limited low molecular weight could be made in such solutions.

It has now been found that by employing controlled process conditions a high molecular weight polyoxymethylene may be made in an aqueous formaldehyde solution, and, furthermore, that the polyoxymethylene prepared by this process is substantially 100% crystalline, which is considerably higher than that of the polyoxymethylene prepared by polymerization of anhydrous formaldehyde in a hydrocarbon medium (crystallinity of 60%–90%). It is well known, of course, that the crystallinity of a polymeric material may be changed by melting or dissolving the polymer. The crystallinity of the product of this invention is substantially 100% when the product is prepared by the process of this invention even though the crystallinity may decrease if the product is thereafter melted or dissolved.

It is an object of this invention to provide a process for the preparation of high molecular weight polyoxymethylenes from an aqueous solution of formaldehyde. It is another object of this invention to provide polyoxymethylenes having a number average molecular weight of at least 15,000, and preferably at least 30,000, and being substantially 100% crystalline. It is another object of this invention to prepare completely crystalline high molecular weight polyoxymethylenes, which, after being esterified or etherified, have the toughness and thermal stability properties of those polymers described and claimed in U.S. Patent 2,768,994 issued October 30, 1956, to R. N. MacDonald. Still other objects will be apparent from the more detailed description of this invention which follows.

The above objects are accomplished in accordance with this invention by a process in which polyoxymethylene seed particles are formed spontaneously from a solution of formaldehyde, water, a polymerization catalyst, and those seed particles are then grown to a high molecular weight polyoxymethylene in a reaction medium of formaldehyde, water, and a polymerization catalyst. An organic diluent may be included, if desired, in the above process steps. The formaldehyde concentration and the reaction conditions of temperature and pressure are, at least in part, different in the two steps of the process, the first step requiring that the solution be sufficiently supersaturated with respect to formaldehyde so that polyoxymethylene seed particles form spontaneously from the formaldehyde solution, and the second step requiring that the solution containing the seed particles be supersaturated with respect to formaldehyde but at a concentration lower than that at which polyoxymethylene seed particles from spontaneously therein. The catalysts may be a combination of certain acids and bases, a combination of certain bases and inert organic liquid diluents, or certain acids alone. By means of this process, polyoxymethylene seed particles may be formed from an aqueous solution of a formaldehyde and grown to a polyoxymethylene having a number average molecular weight of at least 15,000, and preferably at least 30,000. These novel polyoxymethylene products are substantially 100% crystalline, which has never before been known in such high molecular weight polyoxymethylenes.

The general procedure of this process may be understood by reference to FIGURE 1. At any given temperature, an aqueous solution of formaldehyde assumes the characteristics shown in FIGURE 1. For any given system, there is a concentration of formaldehyde at which the system is saturated with respect to formaldehyde. This saturation point is termed the "Equilibrium Concentration" herein. At formaldehyde concentrations below the Equilibrium Concentration (Zone A) polyoxymethylene tends to depolymerize and to dissolve in the aqueous formaldehyde solution. At concentrations above the Equilibrium Concentration (Zones B and C) solid polyoxymethylene made by this process will grow by the addition of monomeric formaldehyde units when placed in contact with the solution. The area containing concentrations higher than the Equilibrium Concentration is supersaturated with respect to formaldehyde, and is divided into Zone B and Zone C by the "Stability Limit," which is shown as a narrow range of concentration—thus, differing from the more sharply defined Equilibrium Concentration. Above the Stability Limit polyoxymethylene forms spontaneously from solution, and to this extent Zone C is a unstable region in which the system is supersaturated with formaldehyde. Between the Equilibrium Concentration and the Stability Limit is a metastable region in which there is no spontaneous formation or nucleation of new polymer particles from a clear solution, although, once polymer particles have been introduced into Zone B, the polymer molecules in these particles will grow and increase in molecular weight by the addition of new monomer units, and the further the process concentration is above the Equilibrium Concentration, the faster the polymer molecule will grow. There has been observed, however, in Zone B a phenomenon of induced nucleation, whereby new polymer molecules are produced, presumably on the surface of polymer particles present in the reaction medium. The rate of induced nucleation, as well as the rate of molecular growth, increases as the process concentration is increased farther and farther above the Equilibrium Concentration. Accordingly, there is an optimum concentration in Zone B where the amount of induced nucleation on polymer particles of any given molecular weight is tolerable as compared to the rate of growth of the polymer molecules in such particles. In the early stages of the process, while the polymer is at a low average molecular weight, a greater amount of nucleation is acceptable since the newly formed polymer molecules do not seriously decrease the average molecular weight of the polymer growing in the reaction medium. As the average molecular weight increases, however, it becomes more important to reduce the rate of nucleation so that monomeric formaldehyde units will add to the larger molecules and thus increase the average molecular weight of the polymer growing in the reaction medium rather than to be employed in the formation of low molecular weight polymers. The rate of induced nucleation may be reduced by adjusting the reaction conditions closer to the Equilibrium Concentration.

The actual numerical values of the formaldehyde concentrations at the Equilibrium Concentration and the Stability Limit are, of course, dependent upon the temperature, the pressure, and the composition of the reaction medium. At high temperatures both the Equilibrium Concentration and the Stability Limit are at high concentrations, and, conversely, at low temperatures both are at low concentrations. Thus, if the polymerization system is at a given concentration of formaldehyde, it may be placed anywhere above or below the Equilibrium Concentration or the Stability Limit by merely adjusting the temperature and pressure of the polymerization medium. The temperature, however, has an effect upon the process of this invention in that an increase in temperature favors the production of polymers of higher molecular weight, increases the rate of total polymer formation, and increases the rate of the Cannizzaro reaction, producing such by-products as formic acid and methanol.

The increase in the rate of the Cannizzaro reaction with increasing temperatures is more pronounced than the increase in the rate of polymer formation, and, therefore, it would appear that the disadvantages of high temperature operation outweigh the advantages. It has been found, however, that the employment of certain polymerization systems, explained in more detail hereinafter, reduces the Cannizzaro reaction rate without seriously impairing the polymerization rate at these higher temperautres. Accordingly, one important feature of the process of this invention, which was unknown heretofore, is that high process temperatures may be employed successfully. The general range of process temperatures is from 60° C. to the boiling point of the reaction medium at the process pressure, this range being from 60° to approximately 100° C. at atmospheric pressure. Lower temperatures than 60° C. are operable, but the reaction rates are very slow. The preferred temperature range is 80° C. to the boiling point of the reaction medium (normally about 100° C.), and the preferred pressure is atmospheric. At atmospheric pressure and at the temperature of 60° C.–100° C., the Equilibrium Concentration might be within the range of about 30%–70% formaldehyde, based on the total weight of water and formaldehyde. The Stability Limit is at a concentration which normally is about 4%–8% higher than that of the Equilibrium Concentration. It is understood, of course, that the presence of components other than formaldehyde and water, in the polymerization system may cause the Equilibrium Concentration or the Stability Limit to be at a somewhat different concentration than would be the case if those components were absent from the system.

The components of the reaction medium of this polymerization process include an aqueous formaldehyde monomer solution, a growing polyoxymethylene chain as a solid phase, a polymerization catalyst, and in some cases, a liquid organic diluent. The reaction medium is a dispersion of growing polyoxymethylene molecules in a liquid medium. Whatever combination of components may be employed, the liquid phase of the reaction medium must be homogeneous, and remain as such throughout the reaction period as the polymer chains of the solid polyoxymethylene particles are increasing in molecular weight. The aqueous monomer solution which is used in the preparation of the reaction medium is normally one in which the formaldehyde concentration is about 35%–85% by weight. The solution may contain some impurities or by-products normally associated with, or derived from, formaldehyde, such as formic acid, methanol, and methylal, although it is desirable to maintain the concentration of these impurities and by-products, as well as that of other extraneous materials, as low as is consistent with the economics of this process. The formaldehyde concentration in the reaction medium may range from about 30% to about 75% based on the weight of water and formaldehyde, although the usual operating range is about 35%–65%.

The polymerization catalyst, sometimes in combination with a liquid organic diluent, is an important feature of this process. The catalyst provides the necessary control over the acidity or basicity of the polymerization medium, and, in addition, provides the catalytic activity for the ionic polymerization which is characteristic of the formation of polyoxymethylene from formaldehyde. There are two general requirements for the catalyst, namely (1) it must form a single phase, liquid solution with the other components of the reaction medium, and (2) it must not form condensation products with formaldehyde and thereby destroy the balance of formaldehyde concentration on otherwise form by-products which alter the reaction conditions such as pH, and catalyst concentration. The latter requirement may be further explained by pointing out that the presence in the reaction medium of active aromatic ring structures or organic compounds containing hydrogen atoms activated by the presence of adjacent groups, such as carbonyl or nitro, results in an irreversible reaction with formaldehyde which may reduce the formaldehyde concentration to an inoperable level. On the other hand, the presence of alcoholic hydroxyl groups does not impair the polymerization process of this invention. The catalyst systems may be conveniently divided into three groups: (1) acid/base combination catalysts, (2) base/diluent combination catalysts, and (3) selected acid catalysts.

The acid/base combinations are mixtures or reaction products of certain bases having a $pK_b$ of less than 7 and acids which have a $pK_a$ of at least 2. The term "$pK_a$" or "$pK_b$" is the negative logarithm of the dissociation constant of the acid or base, respectively, the constant being normally measured at 25° C. on aqueous solutions of the acid or base at a molal concentration of 0.0001–0.01. In general, the salt of an acid/base combination may be used in place of a mixture of the acid and the base, or a part of that mixture—for example, inorganic salts, amine salts, quaternary ammonium salts, and quaternary phosphonium salts. The base should be one which resists hydrolysis and is substantially non-reactive with formaldehyde, as mentioned above. Compounds such as inorganic hydroxides, tertiary amines, and tertiary alkyl phosphines are typical of the operable bases. Secondary amines may be satisfactory in certain embodiments of this process. Primary amines, and any amine containing reactive sites such as a carbonyl group, a nitro group, or an active aromatic ring, are inoperable in this process. The acid, employed in combination with the above-described base, should be one which has a $pK_a$ of at least 2. In the case of a polybasic acid which has more than one acid hydrogen, that polybasic acid is included within the definition if any one of the acid hydrogens has a $pK_a$ of at least 2. Stronger acids may be present in the polymerization medium, without any deleterious effect on the process, so long as the pH and other reaction conditions remain within the operable limits described herein. Strong acids, such as hydrochloric acid, trifluoroacetic acid and fluoroboric acid are outside the above range of $pK_a$. Phenol and similar materials are excluded because of their reactivity with formaldehyde. The preferred acids include phosphoric acid and the unsubstituted aliphatic carboxylic acids having 1–10 carbon atoms per molecule. Examples of preferred acid/base combinations include trimethylamine/phosphoric acid, N-ethylpiperidine/acetic acid, triethylamine/phosphoric acid, tripropylamine/phosphoric acid, sodium acetate/acetic acid, trimethylamine/formic acid, trimethylamine/monosodium phosphate, disodium phosphate, and tetramethylammonium acetate.

The acid/base combination should maintain the reaction medium at a pH of 3.5–8.0. The pH is measured at 60° C. on a portion of the reaction medium diluted by adding water in the amount of 50% of the original weight of the portion. All pH values were measured with a Beckman Glass Electrode pH Meter Model H2. The pH of the reaction medium is important since the polymerization rate increases with increasing pH values. However, the undesirable Cannizzaro reaction also increases in rate with increasing pH, and becomes intolerable at values above about 8.0. It appears that the optimum pH range is about 5.0–6.5. The ratio of acid to base in the acid/base combination is adjusted to provide the chosen pH. It is frequently necessary to buffer the reaction medium, and this may be accomplished by the addition of known buffering materials or by the choice of certain acid/base combinations, such as those specified above, which provide their own buffering action. The concentration of the acid/base combination is normally from 0.1%–20%, and preferably from 2%–10%, by weight of the total reaction medium. The exact amount, of course, depends on the required catalytic activity of promoting polymer growth as well as the pH and buffering requirements.

The second type of catalyst includes certain basic materials, usually in combination with an organic liquid diluent. The basic material should have a $pK_b$ of 2–7, and preferably 3–5, it should be resistant to hydrolysis, and it should be non-reactive with formaldehyde in the same manner as described above. The tertiary amines are preferred in this type of catalyst system. Inoragnic hydroxides are inoperable in this system. The amount of basic material employed in the polymerization medium may vary from about 0.1%–50% by weight of the total polymerization medium, including the diluent, if any. The wide range of amount depends chiefly upon the basicity of the catalyst. N-ethylpiperidine can be employed in relatively smaller amounts (e.g. 1%–10%) than 2,6-lutidine (e.g. 30%–50%) because the former is a much stronger base than the latter. When the base is stronger, it is usually advisable to employ a diluent; but, when the base is weak and, therefore, must be present in large amounts, it is not necessary to incorporate a diluent. The pH of the reaction medium, when using the basic material as a catalyst, should range from about 8–11, although, if there is a large amount of organic liquid diluent present, a range of pH values becomes less and less meaningful.

The diluent, which is frequently employed in combination with the basic catalyst, is a high boiling (at least 100° C.) organic liquid which is completely miscible and non-reactive with the components of the reaction medium. The preferred diluents are the high boiling ethers such as dioxane, tetraethylene glycol dimethyl ether and diethylene glycol diethyl ether. The boiling point of the diluent is important in that the diluent must not be permitted to boil away from the reaction medium at the temperature and pressure employed. The presence of the diluent reduces the Cannizzaro reaction rate as well as the polymerization rate, but the effect upon the Cannizzaro reaction is much more pronounced than that upon the polymerization rate. The amount of diluent may vary from about 25% to about 300% by weight of the aqueous formaldehyde solution employed. The optimum amount of diluent which is recommended is that which provides the greatest reduction in losses of formaldehyde due to the Cannizzaro reaction without seriously reducing the polymerization rate. Amounts above 300% by weight of the aqueous formaldehyde have not been found to offer sufficient advantages to justify the cost of the increased amount of diluent.

The third type of catalyst is acid. Included in this group are the acids and salts capable of producing a pH of 0.5–3.0 in the aqueous reaction medium. Examples of these materials are phosphoric acid and sodium hydrogen sulfate. These catalysts are not as active as the previously mentioned types in that the growth of the polyoxymethylene chains is slower than that which occurs when an acid/base combination or a base/diluent combination is used as the catalyst, and, accordingly, the acid catalyst is not preferred.

For the purpose of illustration, the process of this invention may be conveniently divided into two reaction steps, the first of which deals with the initial stages of the polymerization where a polymer seed is formed or where nucleation occurs, and the second of which deals with the growth of that seed to a high molecular weight polymer having a number average molecular weight of at least 15,000. The step of forming a polymer seed or nucleus is accomplished by adjusting the pressure, temperature, and formaldehyde concentration of a polymerizable starting solution of aqueous formaldehyde and catalyst so that the formaldehyde concentration falls in Zone C above the Stability Limit, and thereby becomes a supersaturated solution. In this condition of pressure, temperature, and concentration, there is a spontaneous formation of polyoxymethylene seeds or nuclei. The supersaturated solution containing polymer seeds has a cloudy appearance or, in some cases, it becomes a gel. Either of two alternative methods may be employed to produce these seeds—namely, the isothermal method or the low-temperature method. In the isothermal method the formaldehyde concentration is adjusted such that, at the prevailing conditions of temperature and pressure, the concentration is above the Stability Limit. The catalyst is then added to the supersaturated solution, whereupon polymer seed particles begin to form and grow. As these seed particles form and grow, the formaldehyde concentration of the solution decreases while the reaction temperature is maintained constant. Thus, the concentration moves from Zone C into Zone B of the drawing and approaches the Equilibrium Concentration as more polymer growth occurs.

In the low-temperature method the starting solution, including the catalyst, is prepared at any convenient temperature, after which the temperature of the starting solution is quickly lowered to the extent necessary to place the concentration above the Stability Limit, and thereby the starting solution becomes a supersaturated solution. Polymer seed formation occurs within a short time. The supersaturated solution is then heated to the processing temperature, and, if necessary, additional formaldehyde solution may be added to adjust the formaldehyde concentration of the reaction medium to the optimum growth point in Zone B between the Equilibrium Concentration and the Stability Limit.

The low-temperature method is preferred, because the reaction time is shorter than that of the isothermal method, and also because the polymer seed from the low-temperature method grows to a desired molecular weight in a shorter time than does that of the isothermal method.

The second step in the polymer formation is the growth of the seed to a high molecular weight polymer. The seed probably has a molecular weight of less than 1000, although it is too unstable to be isolated and characterized. This portion of the process is substantially the same for either type of seed. The seed is maintained in a reaction medium, which normally is substantially the same composition as that of the solutions employed in the first step, at a concentration which is between the Equilibrium Concentration and the Stability Limit (Zone B) and at the concentration for optimum growth, usually in the range of 0.5%–7.0% above the Equilibrium Concentration. In general, as the polymer increases in molecular weight, the formaldehyde concentration is moved closer and closer to the Equilibrium Concentration. The entire process, including seed formation, may be a batch or a continuous process.

In both of the above reaction steps it is important to maintain control over the differences between the actual formaldehyde concentration of the solution or the reaction medium on the one hand, and the Equilibrium Concentration, or Stability Limit, on the other hand. Although the adjustment of pressure affords a means of control over these differences, it is much more convenient to adjust the temperature or the concentration of ingredients in the solution or the reaction medium. A change in temperature shifts the Equilibrium Concentration and the Stability Limit without affecting the actual formaldehyde concentration of the solution or the reaction medium. On the other hand, the actual formaldehyde concentration may be changed by adding formaldehyde or water without shifting the Equilibrium Concentration or the Stability Limit. These two independent methods of control enable the operator to adjust the process conditions quickly and thereby to achieve and to maintain optimum operating conditions.

The product of this process is a high molecular weight polyoxymethylene which has a number average molecular weight of at least 15,000, and preferably at least 30,000, and which is substantially 100% crystalline. This crystallinity is the principal structural feature which distinguishes the product of this invention from that prepared by polymerizing anhydrous formaldehyde in a hydrocarbon reaction medium, the latter type of polyoxymethylene ranging from about 60% to about 90% crystalline. Furthermore, the ease of esterifying the product of this invention indicates that the polymer chains grow in a more orderly fashion than those prepared from anhydrous formaldehyde, in that the growing ends of the chain are at the outside of the polymer molecule and not buried within a tangled mass of polymer chains. The formula of the product of this invention is $$HO-(CH_2-O)_n-H$$

where $n$ is any integer greater than 500 so that the number average molecular weight of the polyoxymethylene is at least 15,000. Since this molecule is terminated at each end of the chain with a hydroxyl group, it has been commonly called polyoxymethylene glycol. These hydroxyl groups are points of weakness, and such a polymer chain may degrade rather easily to monomeric formaldehyde. Accordingly, these groups must be esterified or etherified in order to provide the chain with thermal stability. The esterified polyoxymethylene is described and claimed in copending application Serial No. 681,188, filed by Dal Nogare and Punderson on August 30, 1957. The etherified polyoxymethylene is described and claimed in copending application Serial No. 682,325, filed by Brown, Langsdorf & Schweitzer on September 6, 1957. The polyoxymethylene having one of its terminal valences etherified and the other of its terminal valences esterified is described and claimed in copending application Serial No. 700,338, filed by N. Brown, D. L. Funck, and C. E. Schweitzer, on December 3, 1957.

The polyoxymethylenes made by the processes of this invention may be esterified or etherified to form polyoxymethylene dicarboxylates or polyoxymethylene diethers, either of which polymers is useful as a thermoplastic material for fabrication into films, sheets, and funicular structures such as fibers, filaments, bristles, rods, and tubes; and, furthermore, this product may be extrusion-molded or injection-molded into articles, with or without added pigments, stabilizers, anti-oxidants, or fillers.

In the examples which follow, the above-described process is illustrated. Percentages and proportions are by weight, unless otherwise noted. The procedures for determining the degree of toughness and the reaction rate constant for thermal degradation are described in U.S. Patent 2,768,994 issued to R. N. MacDonald on October 30, 1956. The procedures for esterifying polyoxymethylene are described in copending applications Serial No. 681,188 filed by Dal Nogare and Punderson on August 30, 1957, and Serial No. 443,703 filed by Jenkins and Punderson on July 15, 1954. The procedures for etherifying polyoxymethylene are described in copending application Serial No. 682,325, filed by Brown, Langsdorf & Schweitzer on September 6, 1957.

Number average molecular weight may be measured by the conventional procedure of osmometry. However, it has been found that infrared analysis provides an accurate method of measuring the amount of hydroxyl and the amount of oxymethylene chain which is present in a sample of the polyoxymethylene. After these two amounts have been determined, it is a simple calculation to find the number average molecular weight by knowing that the polymer will have two hydroxyls per chain. The actual procedure employed in measuring the number average molecular weights reported in these examples was to press a film from the polymer to be tested, the film being translucent and crack-free and about 5 mils in thickness, and being pressed at room temperature and at a pressure of about 35,000 p.s.i. The film was then scanned by a Perkin-Elmer Model 21 Spectrophotometer (or its equivalent) equipped with calcium fluoride optics. The absorbance was measured at 2.9 microns (for hydroxyl) and at 2.54 microns (for total oxymethylene chain). The base line for the 2.54 band was a line joining the minimum absorbance at 2.1 microns to the minimum absorbance at 2.7 microns. The base line for the 2.9 band was a line joining the minimum absorbance at 2.7 microns with the minimum absorbance at 3.0 microns. The equation for calculating number average molecular weight from these measurements of infrared observance is:

$$\overline{M}_n = \frac{15,700}{\left(\dfrac{\text{absorbance at 2.9 microns}}{\text{absorbance at 2.54 microns}}\right)}$$

where $\overline{M}_n$ is the number average molecular weight.

EXAMPLE 1

This example illustrates the low-temperature preparation of polymer seed followed by growth of the seed in the presence of an acid/base combination catalyst.

Two solutions were prepared at 95° C. containing the following amounts of the indicated components:

| Component | Solution A, gms. | Solution B, gms. |
|---|---|---|
| 71.9% aqueous formaldehyde | 29.1 | |
| 65.6% aqueous formaldehyde | | 228.0 |
| Water | | 33.1 |
| Acetic acid | 0.69 | 9.47 |
| N-ethylpiperidine | 0.98 | 13.4 |

The analyzed formaldehyde content of these mixtures was 68.8% in Solution A and 52.9% in Solution B. The catalyst recipe in these solutions was, by weight proportions, 0.0848 acetic acid/0.12 N-ethylpiperidine/1.0 water. The mol ratio of the acid/base combination was 1.333 acetic acid/N-ethylpiperidine. The pH of these solutions was 5.6.

Solution A was placed in a 500 ml., 3-neck flask which, in turn, was held for 30 minutes in a bath maintained at 60° C. The flask was then placed in a bath maintained at 95° C. and 200 ml. of Solution B was added to the flask with vigorous agitation during mixing. The resulting mixture was analyzed and found to contain 54.8% formaldehyde (calculated: 54.6%), not counting the polymer seed present. The contents of the flask were gently agitated and maintained at 95° C. for the remainder of the process time. At periodic intervals of about one day, a sample of the reaction medium containing particles of growing polymer was removed, and the polymer particles were isolated and analyzed. Make-up solution was added containing the above catalyst recipe, and containing sufficient formaldehyde to maintain the formaldehyde concentration slightly above the Equilibrium Concentration, which for the reaction conditions of this example was at a formaldehyde concentration of 52.7%. The isolation of the product samples was accomplished by adding the sample taken from the reaction medium to hot water on a filter. After filtration the precipitate was washed, first, with hot water, second, with cold water, and, finally, with acetone. In each of four succeeding cycles of operation a sample of the reaction medium was removed, the polymer isolated and analyzed, and make-up materials were added to the reaction medium, so as to continue the polymerization reaction. The make-up materials were calculated to add sufficient liquid so that the polymer solids would amount to about 1.5% by weight of the entire reaction medium, and, also, so that the formaldehyde concentration would be reduced slightly for each succeeding cycle but would always be slightly in excess of the Equilibrium Concentration. The results of the analysis of each of the four cycles are shown in Table 1, cycle 1 being that which has already been described above.

*Table 1*

| | Cycle 1 | Cycle 2 | Cycle 3 | Cycle 4 |
|---|---|---|---|---|
| Amount of reaction medium remaining from previous cycle (estimated) gm. | None | 220 | 295 | 350 |
| Amount of make-up reaction medium added gm. | 250.4 | 111 | 111 | None |
| Formaldehyde concentration in make-up percent | 54.8 | 54.9 | 55.1 | |
| Formaldehyde concentration of reaction medium after addition of make-up percent | 54.8 | 54.5 | 54.5 | 54.15 |
| Formaldehyde concentration of reaction medium at end of cycle percent | 54.3 | 54.0 | 54.15 | 53.6 |
| Reaction time of cycle hrs. | 17.3 | 23.0 | 24.5 | 28.1 |
| Sample of reaction medium removed for product analysis at end of cycle ml. | 25 | 25 | 50 | All |
| Amount of product polymer recovered from sample gm. | 0.312 | 0.458 | 1.016 | 8.62 |
| Number average molecular weight of polymer from sample | 22,000 | 31,000 | 36,000 | 39,000 |
| Calculated total weight of polymer in reaction medium: | | | | |
| (1) at beginning of cycle gm. | | 2.50 | 5.04 | 6.59 |
| (2) at end of cycle gm. | 2.81 | 5.50 | 7.61 | 8.62 |

The final product from cycle 4 was treated with a mixture of methylal and sulfuric acid in order to introduce methoxy groups at the ends of the polymer chains, and the resulting polymer product was dissolved in a mixture of benzyl alcohol and tripropylamine at 160° C., which treatment is sufficient to depolymerize any polymer chain not terminated by methoxy end groups. The dissolved polymer recovered by reprecipitation was a high molecular weight polyoxymethylene dimethyl ether which had a reaction rate constant for thermal degradation at 222° C. of 0.2% by weight per minute. Films, 3.0–3.5 mils thick, were pressed from a portion of the polyoxymethylene dimethyl ether at 195° C. and 20,000 p.s.i., and, after these films were heated in air at 105° C. for seven days, they could be manually folder and creased along a line and then folded and creased in the reverse direction along the same line without a break occurring in the film along that line. Some films were prepared from a composition of this polyoxymethylene dimethyl ether containing, as additives, 1% by weight of a terpolymer of polycaprolactam, polyhexamethylene adipamide, and polyhexamethylene sebacamide, and 0.2% by weight of 4,4'-butylidene bis(6-tertiary butyl-3-methylphenol), and these films exhibited the same resistance to cracking under the test of folding and creasing which has just been described.

EXAMPLE 2

This example illustrates the process similar to that shown in Example 1 except that a different combination of acid and base was employed as the catalyst. The catalyst recipe by weight proportion was 0.0678 phosphoric acid (85%)/0.0625 trimethylamine/1.0 water, this proportion providing a mol ratio of 0.555 phosphoric acid/trimethylamine.

A solution was prepared at 95° C. containing the following ingredients, and having a pH of 6.5:

| | Gm. |
|---|---|
| 70.7% aqueous formaldehyde | 115.9 |
| Water | 9.1 |
| 21.0% aqueous trimethylamine | 16.7 |
| 85% phosphoric acid | 3.82 |

This solution contained, by analysis, 56.8% by weight of formaldehyde. The solution was placed in a 200 ml. volumetric flask which, in turn, was placed in a bath for 30 minutes at 60° C. The flask was then placed in a bath at 95° C. and maintained at that temperature for 24.7 hours. The Equilibrium Concentration of this system was 52% formaldehyde, and, at the end of the reaction period of 24.7 hours, the formaldehyde concentration of the reaction medium was 55.0%. At the end of the reaction period, the solid product was isolated by diluting the reaction medium with a small amount of water, followed in order by filtration, washing with hot water, washing with cold water, and washing with acetone. The product weighed 4.96 grams and was a polyoxymethylene having a number average molecular weight of 30,000.

A portion, 0.910 gm., of this polyoxymethylene was mixed with 59.1 gm. of an aqueous formaldehyde solution analyzing 53.9% formaldehyde and containing the same catalyst recipe given above. The resulting mixture was maintained in a bath at 95° C. for 23.8 hours, at the end of which time the formaldehyde concentration had fallen to 52.8%. The product was filtered and washed as described above, and found to weigh 1.095 gm. The product was a polyoxymethylene having a number average molecular weight of 38,000.

EXAMPLE 3

This example illustrates the employment of the base/diluent catalyst system incorporating the low-temperature method of seed preparation. The catalyst recipe by weight was 0.39 N-ethylpiperidine/3.11 dioxane/1.0 water.

A solution was prepared at 100° C. containing the following ingredients, and having a pH of about 9.5:

| | Gm. |
|---|---|
| 73.2% aqueous formaldehyde | 350.0 |
| Water | 26.9 |
| N-ethylpiperidine | 47.1 |
| Dioxane | 376.0 |

This solution was placed in a bath at 80° C. and found, by analysis, to contain 32.1% by weight of formaldehyde. A 100 ml. portion of this solution was placed in a 1-liter volumetric flask, which, in turn, was placed in a bath at 40° C. for 30 minutes. The flask was then placed in a bath at 80° C. and there was added to the contents of the flask the remainder of the above solution plus an additional 86 grams of a solution containing water, N-ethylpiperidine, and dioxane (but no formaldehyde) in the above ratio. The calculated formaldehyde content of the resulting solution (not including the formaldehyde in polymeric form) was 28.9% and the concentration found by analysis was 28.4%. The Equilibrium Concentration of this system was 24.6% formaldehyde. This solution was maintained at 80° C. without agitation for 23.3 hours, at the end of which time the formaldehyde concentration of the reaction medium had fallen to 25.4%. The reaction medium was added to 4 liters of dioxane at room temperature, and the product polymer was filtered, washed with acetone and oven-dried. The product was 38.1 grams of polyoxymethylene having a number average molecular weight of 17,000. A portion of this polymer product was then mixed with an amount of freshly prepared reaction medium having the above recipe proportions of N-ethylpiperidine/dioxane/water and a formaldehyde concentration as indicated in Table 2. Each succeeding cycle used a portion of the product polymer from the preceding cycle.

*Table 2*

| | Cycle 2 | Cycle 3 | Cycle 4 | Cycle 5 |
|---|---|---|---|---|
| Amount of liquid reaction medium at beginning of cycle_____gm__ | 721 | 437 | 337 | 311 |
| Formaldehyde concentration in liquid reaction medium at beginning of cycle_____percent__ | 28.9 | 27.7 | 26.6 | 26.7 |
| Formaldehyde concentration in liquid reaction medium at end of cycle_____percent__ | 27.7 | 26.5 | 25.7 | 26.0 |
| Amount of solid polymer in reaction medium at beginning of cycle_gm__ | 7.28 | 7.28 | 5.46 | 5.46 |
| Amount of solid polymer in reaction medium at end of cycle_____gm__ | 17.2 | 10.97 | 6.70 | 6.35 |
| Number average molecular weight of polymer at end of cycle_____ | 29,000 | 33,000 | 36,000 | 41,000 |
| Time of reaction period per cycle_hrs__ | 25.0 | 26.4 | 45.4 | 46.1 |

The product of cycle 5 in Table 2 was acetylated by treatment with acetic anhydride and found to have a reaction rate constant for thermal degradation at 222° C. of 0.13% by weight per minute, and to have a degree of toughness of at least 1.

A series of growth cycles paralleling those of Table 2 were run in which the formaldehyde concentration in the liquid reaction medium at the beginning of the third cycle was 26.8%, at the beginning of the fourth cycle was 26.9%, and at the beginning of the fifth cycle was 26.8%. Otherwise the cycle reaction conditions were the same as those shown in the table. The final product from the fifth cycle had a number average molecular weight of 45,000.

EXAMPLE 4

This example illustrates the use of a base/diluent catalyst employing the isothermal method of seed formation. The catalyst recipe, by weight, was 2.333 N-ethylmorpholine/1.167 dioxane/1 water.

A solution was prepared by mixing the following ingredients in a 500 ml., 4-neck flask maintained at 80° C. in an oil bath. The pH of this solution was about 8.0.

| | Gm. |
|---|---|
| 73.0% aqueous formaldehyde | 160.0 |
| N-ethylmorpholine | 100.7 |
| Dioxane | 50.3 |

The formaldehyde concentration of this solution was found by analysis to be 37.55% by weight. At the reaction conditions, the Equilibrium Concentration was 26.0% and the Stability Limit was about 30%–34% by weight of formaldehyde. The solution was agitated gently for 92.2 hours, after which time the formaldehyde concentration had fallen to 26.45%, and there was present in the reaction medium 46.3 grams of a polyoxymethylene having a number average molecular weight of 18,000.

A portion of this polymer was placed in a liquid reaction medium having the above recipe proportions of catalyst and water and containing the formaldehyde concentration indicated in Table 3. The reaction temperature was maintained at 95° C., and the reaction was not agitated, throughout all cycles of operation, which proceeded as described in the above examples. At 95° C. the Equilibrium Concentration in this reaction medium was 33.6% formaldehyde.

*Table 3*

| | Cycle 2 | Cycle 3 | Cycle 4 | Cycle 5 |
|---|---|---|---|---|
| Amount of liquid reaction medium at beginning of cycle_____gm__ | 108.5 | 105.3 | 72.0 | 74.5 |
| Formaldehyde concentration in liquid reaction medium at beginning of cycle_____percent__ | 36.6 | 36.8 | 35.6 | 35.1 |
| Formaldehyde concentration in liquid reaction medium at end of cycle_____percent__ | 35.5 | 35.7 | 35.1 | 34.7 |
| Amount of solid polymer in reaction medium at beginning of cycle_gm__ | 1.820 | 1.820 | 1.270 | 1.270 |
| Amount of solid polymer in reaction medium at end of cycle_____gm__ | 3.393 | 2.978 | 1.644 | 1.547 |
| Number average molecular weight of polymer at end of cycle_____ | 27,000 | 32,000 | 36,000 | 40,000 |
| Time of reaction period per cycle_hrs__ | 44.9 | 47.3 | 41.8 | 46.6 |

The product from cycle 5 in the table was acetylated by treatment with acetic anhydride and found to have a degree of toughness of at least 1 and a reaction rate constant for thermal degradation at 222° C. of 0.34% by weight per minute.

EXAMPLE 5

This example illustrates a process similar to that described in Example 4 except that 2-dimethylaminoethanol was employed as the base in the place of N-ethylmorpholine. The catalyst recipe by weight was 0.25 2-dimethylaminoethanol/1 formaldehyde, and the diluent recipe by weight was 3 dioxane/1 water.

A solution was prepared in a 5-liter flask at 80° C. with the following ingredients, the resulting pH being 8.8–9.0:

| | Gm. |
|---|---|
| 75.0% aqueous formaldehyde | 1112 |
| Dioxane | 864 |
| 2-Dimethylaminoethanol | 209 |

This solution analyzed 38.2% by weight of formaldehyde. The Equilibrium Concentration at these reaction conditions was 28.8% by weight of formaldehyde and the Stability Limit was in the general range of about 33%–37% by weight of formaldehyde. After 67.9 hours of reaction period at 80° C. the formaldehyde content had fallen to 29.3% and the polyoxymethylene product isolated from the system weighed 264 grams and had a number average molecular weight of 18,000.

In a succession of three more cycles, using as the feed polymer for each cycle a portion of the product polymer from the preceding cycle, the above-described polyoxymethylene product was subjected to isothermal conditions promoting further growth of the polymer. The conditions of the succeeding cycles are listed in Table 4.

Table 4

|  | Cycle 2 | Cycle 3 | Cycle 4 |
|---|---|---|---|
| Amount of liquid reaction medium at beginning of cycle_____gm__ | 2,865 | 1,990 | 1,734 |
| Formaldehyde concentration in liquid reaction medium at beginning of cycle percent__ | 33.1 | 31.4 | 30.2 |
| Formaldehyde concentration in liquid reaction medium at end of cycle percent__ | 29.9 | 30.0 | 29.4 |
| Amount of solid polymer in reaction medium at beginning of cycle____gm__ | 41.0 | 26.0 | 26.0 |
| Amount of solid polymer in reaction medium at end of cycle_____gm__ | 112.1 | 38.0 | 30.3 |
| Number average molecular weight of polymer at end of cycle_____ | 30,000 | 36,000 | 41,000 |
| Time of reaction period per cycle__hrs__ | 74.2 | 70.6 | 71.8 |

The product of cycle 4 was acetylated by reaction with acetic anhydride and the resulting acetylated polyoxymethylene exhibited a degree of toughness of at least 1 and a reaction rate constant for thermal degradation at 222° C. of 0.46% by weight per minute.

EXAMPLES 6-10

Several other catalyst systems were tried following the procedures of Examples 1-5. The reactions of this example were carried out in order to grow polyoxymethylenes having a molecular weight which was high enough to indicate the operability of the process and catalyst to produce higher molecular weight polymers. The reactions of these examples correspond to a total of one or two cycles of Examples 1-5. Table 5 summarizes the results of these reactions, none of which employed an additional organic liquid diluent. In these examples, as in Examples 1-5, the seed formation and the growth reaction were performed with the same catalyst system. Other experiments, not reported here, have employed a different catalyst system for the seed formation than for the growth reaction.

Table 5

| Example | Catalyst Recipe By Weight | | pH | Range of Formaldehyde Concentration From Beginning to End of Reaction, Percent | Method of Seed Formation | Reaction Temp., ° C. | Total Reaction Time, Hrs. | Number Average Molecular Weight of Product |
|---|---|---|---|---|---|---|---|---|
| 6 | 0.058<br>0.12<br>1 | N-ethylpiperidine<br>sodium dihydrogen phosphate<br>water | 6.2 | 53.9-52.9 | Low-temperature. | 95 | 18.5 | 31,000 |
| 7 | 0.0625<br>0.0669<br>1 | trimethylamine<br>oxalic acid<br>water | 5.6-5.9 | 62.6-61.8 | Isothermal | 95 | 23.2 | 15,000 |
| 8 | 0.156<br>1 | disodium hydrogen phosphate<br>water | about 8.2 | 41.6-39.6 | Low-temperature. | 80 | 39.4 | 24,000 |
| 9 | 0.172<br>1 | sodium dihydrogen phosphate<br>water | about 4.5 | 60.8-60.0 | Isothermal | 95 | 41.8 | 18,000 |
| 10 | 0.25<br>1 | phosphoric acid (85%)<br>water | about 1.2 | 47.3-45.4 | Low-temperature. | 80 | 21.4 | 19,000 |

The above examples are illustrative of various embodiments of this invention. It is, however, not intended that this invention be limited by the descriptions in those examples, but only by the terms of the appended claims.

I claim:

1. The process of polymerizing aqueous formaldehyde which comprises forming a starting solution of formaldehyde, water, and a polymerization catalyst, adjusting the temperature, pressure and formaldehyde concentration of said solution such that the said concentration is from 30%-75% by weight of formaldehyde based on the total weight of water and formaldehyde, and the said solution is sufficiently supersaturated with respect to formaldehyde that polyoxymethylene seed particles form spontaneously therein, maintaining that supersaturated condition until said solution becomes visibly cloudy with seed particles, placing said seed particles in a reaction medium comprising formaldehyde, water, and a polymerization catalyst, the temperature of said reaction medium being from 60° C. to the boiling point of said medium, the formaldehyde concentration of said reaction medium, at the reaction temperature and pressure, being from about 0.5% to about 7.0% greater than the weight percentage of formaldehyde required to saturate said reaction medium with respect to formaldehyde but less than the lowest concentration at which seed particles of polyoxymethylene form spontaneously from said reaction medium, maintaining the reaction temperature, pressure, and formaldehyde concentration of said reaction medium for a period of time sufficient for said seed particles to grow to a number average molecular weight of at least 15,000, said polymerization catalyst being a chemical substance which is non-reactive with formaldehyde to form a substantial amount of irreversible by-products under the reaction conditions, and which is selected from the group consisting of (1) an acid/base combination in which the acid has a $pK_a$ of at least 2 for any hydrogen on said acid and the base has a $pK_b$ of less than 7, and said combination being in such an amount and such proportions that the pH of said solution and of said reaction medium is from 3.5-8.0, (2) a basic material and a diluent, said basic material having a $pK_b$ of 2-7 and in an amount sufficient to cause the pH of said solution and of said reaction medium to be from 8-11, and said diluent being an inert organic liquid boiling above 100° C., and (3) an acidic material in sufficient concentration in said solution and in said reaction medium to produce a pH of 0.5-3.0.

2. The process of claim 1 in which the reaction pressure is atmospheric and the reaction temperature of said supersaturated solution during the formation of said seed particles is substantially the same as the temperature of said reaction medium.

3. The process of claim 1 in which the spontaneous formation of polyoxymethylene seed particles in said superstaturated solution is effected by lowering the temperature of said starting solution.

4. The process of polymerizing aqueous formaldehyde to a high molecular weight polyoxymethylene which comprises forming a starting solution having a pH of 5.0-6.5 and consisting essentially of formaldehyde, water, and a polymerization catalyst which is non-reactive with formaldehyde under the reaction conditions to form irreversible by-products in substantial amounts, said catalyst comprising a tertiary amine and an acid having a $pK_a$ for any hydrogen on said acid of at least 2, the amount of said catalyst being from 0.1%–20% by weight of said solution, the concentration of formaldehyde in said solution being from 30%–75% by weight of water and formaldehyde in said solution, adjusting the temperature of said solution so as to cause the solution to be sufficiently supersaturated with respect to formaldehyde that polyoxymethylene seed particles form spontaneously therein, maintaining the temperature and pressure substantially constant until the supersaturated solution becomes visibly cloudy with said seed particles, placing said seed particles in a reaction medium maintained at a temperature from 60° to the boiling point of said reaction medium, and comprising formaldehyde, water and said catalyst, the formaldehyde concentration and the temperature of said reaction medium being adjusted so that the reaction medium is supersaturated with respect to formaldehyde in the amount of from about 0.5% to about 7.0% greater than the weight percentage required for saturation but at a concentration lower than that at which polyoxymethylene seed particles form spontaneously therein, maintaining the reaction pressure substantially constant and adjusting the temperature and the formaldehyde concentration of the reaction medium so that the amount of formaldehyde supersaturation becomes less and less as the polyoxymethylene seed particles increase in molecular weight, and recovering polyoxymethylene having substantially 100% crystallinity and having a number average molecular weight of at least 15,000.

5. The process of claim 4 in which the acid component of said catalyst is phosphoric acid.

6. The process of claim 4 in which the acid component of said catalyst is an aliphatic carboxylic acid having 1–10 carbon atoms per molecule.

7. The process of claim 4 in which the acid component of said catalyst is an alkali metal salt of phosphoric acid.

8. The process of polymerizing aqueous formaldehyde to a high molecular weight polyoxymethylene which comprises forming a starting solution having a pH of 8–11 and consisting essentially of an aqueous solution of formaldehyde containing 30%–75% by weight of formaldehyde, 25%–300% by weight of said aqueous solution of formaldehyde of an inert organic liquid having a boiling point of at least 100° C. and being non-reactive with the other reaction ingredients, and 2%–10% by weight of said starting solution of a polymerization catalyst which is non-reactive with formaldehyde under the reaction conditions to form substantial amounts of irreversible by-products, said catalyst comprising a base having a $pK_b$ of 3–5, adjusting the temperature of said starting solution so as to cause the solution to be sufficiently supersaturated with respect to formaldehyde that polyoxymethylene seed particles form spontaneously therein, maintaining that supersaturated condition until the solution becomes visibly cloudy with said seed particles, placing said seed particles in a reaction medium consisting essentially of the same components as in said starting solution, adjusting the formaldehyde concentration and the temperature of said reaction medium so that the reaction medium is supersaturated with respect to formaldehyde in the amount of from about 0.5% to about 7.0% greater than the weight percentage required for saturation but at a concentration lower than that at which polyoxymethylene seed particles form spontaneously therein, maintaining the reaction pressure substantially constant and adjusting the temperature between 60° C. and 100° C. and adjusting the formaldehyde concentration of said reaction medium so that the amount of formaldehyde supersaturation concentration becomes less and less as the polyoxymethylene seed particles increase in molecular weight, and recovering substantially 100° crystalline polyoxymethylene having a number average molecular weight of at least 15,000.

9. The process of claim 8 in which the base is a tertiary amine and the organic liquid is an ether.

10. The process of claim 9 in which the ether is dioxane.

References Cited in the file of this patent

UNITED STATES PATENTS 2,768,994     MacDonald _____ Oct. 30, 1956

OTHER REFERENCES

Walker: "Formaldehyde" ACS Monograph #120 (1953), pp. 47, 48, 75, 76, 117 and 145.

UNITED STATES PATENT OFFICE
CERTIFICATE OF CORRECTION

Patent No. 3,000,861            September 19, 1961

Northrop Brown et al.

It is hereby certified that error appears in the above numbered patent requiring correction and that the said Letters Patent should read as corrected below.

Column 4, line 52, for "on" read -- or --; column 10, line 15, for "folder" read -- folded --; column 15, lines 8 and 9, for "the temperature and pressure substantially constant" read -- that supersaturated condition --.

Signed and sealed this 20th day of February 1962.

(SEAL)
Attest:

ERNEST W. SWIDER
Attesting Officer

DAVID L. LADD
Commissioner of Patents